US011963920B2

(12) United States Patent
Lee et al.

(10) Patent No.: US 11,963,920 B2
(45) Date of Patent: *Apr. 23, 2024

(54) MASSAGE APPLIANCE HAVING FLOATING MOTOR AND VIBRATION PLATE FOR VIBRATION ISOLATION

(71) Applicant: Pado, Inc., Valencia, CA (US)

(72) Inventors: Steven Lee, Valencia, CA (US); Alejandro Garfio, Mission Viejo, CA (US); Travis Frye, Burbank, CA (US)

(73) Assignee: Pado, Inc., Valencia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/722,706

(22) Filed: Apr. 18, 2022

(65) Prior Publication Data

US 2023/0000718 A1 Jan. 5, 2023

Related U.S. Application Data

(63) Continuation of application No. 16/526,408, filed on Jul. 30, 2019, now Pat. No. 11,304,871.

(Continued)

(51) Int. Cl.
*A61H 23/02* (2006.01)

(52) U.S. Cl.
CPC . *A61H 23/0263* (2013.01); *A61H 2023/0281* (2013.01); *A61H 2201/0153* (2013.01); *A61H 2201/1695* (2013.01); *A61H 2203/03* (2013.01)

(58) Field of Classification Search
CPC ................ A61H 23/00; A61H 23/0263; A61H 2201/0153; A61H 2023/0281;

(Continued)

(56) References Cited

U.S. PATENT DOCUMENTS

| | | | |
|---|---|---|---|
| 1,545,027 | A | 7/1925 | Ashlock |
| 1,657,765 | A | 1/1928 | Pasque |

(Continued)

FOREIGN PATENT DOCUMENTS

| | | |
|---|---|---|
| CA | 170541 | 7/1916 |
| CN | 2297192 | 11/1998 |

(Continued)

OTHER PUBLICATIONS

Amazon, "Paw Wave Perk Pet Massager", Mar. 9, 2021. https://www.amazon.com/PAW-WAVE-Percussion-Vibration-Circulation dp/B08SR884YX/ref=cm_cr_arp_d_product_top?ie=UTF8. Shown on p. 1. (Year: 2021).

(Continued)

*Primary Examiner* — Colin W Stuart
*Assistant Examiner* — Matthew R Moon
(74) *Attorney, Agent, or Firm* — Sheppard, Mullin, Richter & Hampton LLP

(57) ABSTRACT

A vibration appliance includes a vibration-isolation structure which substantially reduces vibration felt by the user at the handle. The vibration motor is mounted to a vibration plate which carries the massage node. The vibration plate floats within the vibration appliance housing, being suspended by a flexible, elastomer membrane having contours such as curves or folds in it that provide freedom of movement of the vibration plate relative to the housing to which the flexible membrane is mounted. This arrangement can be thought of as the motor and vibration node being mounted on a flexible diaphragm that can move freely as if mounted to the housing by a bellows-like arrangement.

20 Claims, 7 Drawing Sheets

Related U.S. Application Data

(60) Provisional application No. 62/724,393, filed on Aug. 29, 2018.

(58) Field of Classification Search
CPC ........ A61H 2201/1695; A61H 2203/03; A61H 7/005; A63B 13/00; A63B 13/006
See application file for complete search history.

(56) References Cited

U.S. PATENT DOCUMENTS

| | | | | |
|---|---|---|---|---|
| 1,660,821 | A | 2/1928 | Sweetland | |
| 2,078,159 | A | 4/1937 | Redding | |
| 3,169,521 | A | 2/1965 | McCaw | |
| 3,494,353 | A | 2/1970 | Frederick | |
| 3,532,918 | A | 10/1970 | Hunt, Jr. | |
| D222,570 | S | 11/1971 | Young | |
| 3,968,789 | A | 7/1976 | Simoncini | |
| 3,993,052 | A | 11/1976 | Miyahara | |
| 4,224,932 | A | 9/1980 | Farb | |
| 4,669,452 | A | 6/1987 | Osawa | |
| D301,617 | S | 6/1989 | Yonesawa | |
| 4,958,628 | A * | 9/1990 | Iwamoto | A61H 23/0263 601/72 |
| D320,922 | S | 10/1991 | Lurkis | |
| D323,034 | S | 1/1992 | Reinstein | |
| 5,117,815 | A | 6/1992 | Gentry | |
| 5,183,034 | A | 2/1993 | Yamasaki | |
| D334,430 | S | 3/1993 | Tsou | |
| 5,193,528 | A | 3/1993 | Iwamoto | |
| D352,443 | S | 11/1994 | Chen | |
| D372,313 | S | 7/1996 | McMillan | |
| D372,656 | S | 8/1996 | Nagano | |
| D373,197 | S | 8/1996 | Schepper | |
| D379,580 | S | 6/1997 | Amundsen | |
| D385,965 | S | 11/1997 | Wallesen | |
| D388,175 | S | 12/1997 | Lie | |
| 5,803,916 | A | 9/1998 | Kuznets | |
| D407,498 | S | 3/1999 | Cooper | |
| 5,979,285 | A | 11/1999 | Rasmussen | |
| 6,102,875 | A | 8/2000 | Jones | |
| 6,102,876 | A | 8/2000 | Winger | |
| D435,913 | S | 1/2001 | Harris | |
| D438,308 | S | 2/2001 | Harris | |
| D442,918 | S | 5/2001 | Knight | |
| D447,810 | S | 9/2001 | Hannah | |
| D456,909 | S | 5/2002 | Szabo | |
| D463,862 | S | 10/2002 | Lau | |
| D465,716 | S | 11/2002 | Hsieh | |
| 6,478,755 | B2 | 11/2002 | Young | |
| D467,347 | S | 12/2002 | Yang | |
| D469,879 | S | 2/2003 | Chen | |
| D484,248 | S | 12/2003 | O'Brien | |
| D484,608 | S | 12/2003 | Tinsley | |
| D493,348 | S | 7/2004 | Bertani | |
| 6,911,010 | B2 | 6/2005 | Dirks | |
| D510,139 | S | 9/2005 | Gilad | |
| 6,979,285 | B2 | 12/2005 | Lovison | |
| 7,013,588 | B2 | 3/2006 | Chang | |
| D530,020 | S | 10/2006 | Cooper | |
| 7,125,390 | B2 | 10/2006 | Ferber | |
| D532,113 | S | 11/2006 | Huang | |
| 7,435,232 | B2 | 10/2008 | Liebschner | |
| D590,127 | S | 4/2009 | Caudill | |
| D627,897 | S | 11/2010 | Yde | |
| D639,442 | S | 6/2011 | Chandler | |
| D649,657 | S | 11/2011 | Petersen | |
| D652,945 | S | 1/2012 | Chen | |
| D655,919 | S | 3/2012 | Daley | |
| D656,621 | S | 3/2012 | Matsushita | |
| D657,065 | S | 4/2012 | Matsushita | |
| D657,831 | S | 4/2012 | Kurpat | |
| D666,734 | S | 9/2012 | Takashima | |
| D671,226 | S | 11/2012 | Aulwes | |
| D673,284 | S | 12/2012 | Lowsky | |
| D674,499 | S | 1/2013 | Palm | |
| D674,500 | S | 1/2013 | Matsushita | |
| 8,372,111 | B2 | 2/2013 | Reyna | |
| D695,413 | S | 12/2013 | Grust | |
| D698,935 | S | 2/2014 | Larson | |
| D703,825 | S | 4/2014 | Barrett | |
| D708,755 | S | 7/2014 | Kim | |
| D722,256 | S | 2/2015 | Kita | |
| D725,788 | S | 3/2015 | Matsushita | |
| D726,926 | S | 4/2015 | Matsushita | |
| D726,927 | S | 4/2015 | Matsushita | |
| D727,514 | S | 4/2015 | Matsushita | |
| D728,115 | S | 4/2015 | Matsushita | |
| 9,107,799 | B2 | 8/2015 | Muchisky | |
| D738,522 | S | 9/2015 | Matsuura | |
| D754,868 | S | 4/2016 | Hendrickson | |
| D761,075 | S | 7/2016 | Masalin | |
| D761,429 | S | 7/2016 | Sedic | |
| 9,532,918 | B1 | 1/2017 | Louis | |
| D807,134 | S | 1/2018 | Hughes | |
| D815,508 | S | 4/2018 | Dovellos | |
| D818,599 | S | 5/2018 | Lee | |
| D820,466 | S | 6/2018 | Matsushita | |
| D823,478 | S | 7/2018 | Park | |
| D826,418 | S | 8/2018 | Lad | |
| 10,105,280 | B2 | 10/2018 | Buchner Santos | |
| D837,395 | S | 1/2019 | Gan | |
| 10,206,848 | B2 | 2/2019 | Matsushita | |
| D842,487 | S | 3/2019 | Matsushita | |
| D842,491 | S | 3/2019 | Fleming | |
| D843,002 | S | 3/2019 | Yarborough | |
| D847,363 | S | 4/2019 | Aulwes | |
| D847,364 | S | 4/2019 | Lee | |
| D848,017 | S | 5/2019 | Zheng | |
| D848,089 | S | 5/2019 | Cunniff | |
| 10,314,762 | B1 | 6/2019 | Marton | |
| 10,327,981 | B1 | 6/2019 | Ayotte | |
| D852,971 | S | 7/2019 | Gan | |
| D855,197 | S | 7/2019 | Park | |
| D857,907 | S | 8/2019 | Luo | |
| D857,908 | S | 8/2019 | Matsushita | |
| D857,909 | S | 8/2019 | Matsushita | |
| D858,789 | S | 9/2019 | Logan | |
| D861,186 | S | 9/2019 | Matsuura | |
| D863,580 | S | 10/2019 | Lee | |
| D863,581 | S | 10/2019 | Lee | |
| D864,407 | S | 10/2019 | Zhou | |
| D866,189 | S | 11/2019 | Baxter | |
| D869,673 | S | 12/2019 | Chen | |
| D872,295 | S | 1/2020 | Friedman | |
| D899,615 | S | 10/2020 | Lin | |
| D903,140 | S | 11/2020 | Andrejs | |
| D923,191 | S | 6/2021 | Park | |
| D923,192 | S | 6/2021 | Park | |
| D925,057 | S | 7/2021 | Song | |
| D928,334 | S | 8/2021 | Chou | |
| D928,979 | S | 8/2021 | Park | |
| D939,222 | S | 12/2021 | Brandt | |
| D946,166 | S | 3/2022 | Li | |
| D949,416 | S | 4/2022 | Khubani | |
| 11,304,871 | B2 * | 4/2022 | Lee | A61H 1/00 |
| 11,331,245 | B2 * | 5/2022 | Lee | A61H 1/00 |
| D970,743 | S | 11/2022 | Brailey | |
| 2003/0009116 | A1 | 1/2003 | Luettgen | |
| 2004/0254507 | A1 | 12/2004 | Off | |
| 2005/0075591 | A1 | 4/2005 | Hafemann | |
| 2005/0113725 | A1 * | 5/2005 | Masuda | A61H 23/0263 601/72 |
| 2005/0113870 | A1 | 5/2005 | Miller | |
| 2006/0155220 | A1 | 7/2006 | Oslay | |
| 2006/0282025 | A1 | 12/2006 | McDonald | |
| 2007/0270727 | A1 | 11/2007 | Khorassani Zadeh | |
| 2008/0209648 | A1 | 9/2008 | Taggart | |
| 2009/0083919 | A1 * | 4/2009 | Taggart | A46B 13/023 15/186 |
| 2009/0306560 | A1 | 12/2009 | Lund | |
| 2010/0130334 | A1 | 5/2010 | Roney | |
| 2010/0145242 | A1 | 6/2010 | Tsai | |
| 2011/0224588 | A1 | 9/2011 | Grippo | |

(56) References Cited

U.S. PATENT DOCUMENTS

| | | | | |
|---|---|---|---|---|
| 2012/0067164 | A1 | 3/2012 | Su | |
| 2013/0060081 | A1 | 3/2013 | Carter | |
| 2013/0261516 | A1 | 10/2013 | Cilea | |
| 2014/0101892 | A1 | 4/2014 | Puig | |
| 2014/0357944 | A1 | 12/2014 | Spietz | |
| 2014/0358045 | A1 | 12/2014 | Toto | |
| 2015/0005682 | A1 | 1/2015 | Danby | |
| 2015/0150599 | A1 | 6/2015 | Matsushita | |
| 2015/0150758 | A1 | 6/2015 | Turnbow-Faraci | |
| 2015/0305487 | A1* | 10/2015 | Pardo | A61H 23/0263 15/22.1 |
| 2015/0305969 | A1 | 10/2015 | Giraud | |
| 2016/0367425 | A1 | 12/2016 | Wersland | |
| 2017/0042754 | A1 | 2/2017 | Fowers | |
| 2017/0304145 | A1 | 10/2017 | Pepe | |
| 2017/0326021 | A1 | 11/2017 | Matsushita | |
| 2017/0367923 | A1* | 12/2017 | Bergbacka | A61H 7/001 |
| 2018/0200141 | A1 | 7/2018 | Wersland | |
| 2019/0175434 | A1 | 6/2019 | Zhang | |
| 2019/0343713 | A1 | 11/2019 | Boghosian | |
| 2020/0085675 | A1 | 3/2020 | Lee | |

FOREIGN PATENT DOCUMENTS

| | | |
|---|---|---|
| CN | 203710331 | 7/2014 |
| CN | 204181536 U | 3/2015 |
| CN | 204932218 U | 1/2016 |
| CN | 106255439 | 12/2016 |
| CN | 207011895 U | 2/2018 |
| CN | 208525375 | 2/2019 |
| CN | 110812178 | 2/2020 |
| DE | 3822394 | 1/1990 |
| EM | 002384149 | 1/2014 |
| EM | 005542016 | 8/2018 |
| ID | 0000003563 | 5/2003 |
| JP | 2000185084 A | 1/2005 |
| MY | 14000590202 | 9/2014 |

OTHER PUBLICATIONS

Back Muscle Pain Massger Wooden Stick T-Shaped Cross Wood Body Therapy Spa, retrieved from eBay.com approximately Aug. 31, 2018.

Pawwave, "Paw Wave Perk", Dec. 21, 2020. https://pawwave.pet/paw-wave-perk-percussion-pet-massager-orange/ Shown on p. 1. (Year: 2020).

Point Relief Manual Massager, retrieved from https://www.fab-ent.com/massage/manual-massagers/point-relief-manual-massager/ approximately Aug. 3, 2018.

Timtam Power Massager V1.5, retrieved from https://timtam.tech/products/timtam-power-massager-v1-5 approximately Aug. 31, 2018.

Wahl Deep-Tissue Percussion Therapy Massager, retrieved from https://wahlusa.com/products/deep-tissue-4290-300 approximately Aug. 31, 2018.

Y Shape Solar Energy Beauty Bar/Body Massage Roller, retrieved from http://worjaku.com/product/y-shape-solar-energy-beauty-bar-body-massage-roller/ approximately Aug. 3, 2018.

Youtube, "Paw Wave Pet Massager Introduction", Dec. 16, 2020. https://www.youtube.com/watch?v=AdlfwqGhOsw. Shown at the 0:49 second mark. (Year: 2020).

Zyllion ZMA-16 Handheld Therapeutic Percussion Massager With Heat, retrieved as an archived version from Amazon.com dated Apr. 10, 2016.

* cited by examiner

MASSAGE APPLIANCE HAVING FLOATING MOTOR AND VIBRATION PLATE FOR VIBRATION ISOLATION

CROSS-REFERENCE TO RELATED APPLICATIONS

This application is a continuation of U.S. patent application Ser. No. 16/526,408, filed Jul. 30, 2019, which claims the benefit of U.S. Provisional Patent Application Ser. No. 62/724,393 filed Aug. 29, 2018, which is incorporated by reference as if set forth herein in its entirety.

BACKGROUND OF THE INVENTION

1. Field of the Invention

This invention relates to the field of massage appliances. More particularly, this invention relates to the field a massage appliance having a motor that is mounted such that the motor floats relative to the handle and main body of the device, thus isolating the handle from most of the vibration created by the motor.

2. Description of Related Art

Electric hand-held massage appliances provide massage to targeted parts of the body. Massage appliances include both vibration type and percussive type massagers.

One drawback of massage appliances is that the mechanism that creates the vibration, which is usually an electric motor having an eccentric weight attached thereto, causes vibration not only at the massage head where the vibration is desired, but also in the handle where vibration is not desired. The vibration in the handle can cause discomfort, fatigue, and/or cramping in the person holding the device, or even carpal tunnel syndrome in extreme cases of prolonged use.

SUMMARY OF THE INVENTION

The present invention is of a massage appliance having a motor that is mounted such that the motor floats relative to the handle of the device, thus isolating the handle from most of the vibration created by the motor.

In one aspect, the invention employs a flexible diaphragm with the vibration motor(s) mounted to one face of a central portion of the diaphragm and the massage head or node mounted to the other face of the central portion. The central portion which carries the massage node, which is the part that contacts the subject being massaged and applies the massage, is relatively free to move in all of the x-, y-, and z-directions due to the presence of one or more flexible contours surrounding the central portion such as folds, bends, or curves. The flexible contour(s) can be thought of as bellows and perform a similar function as bellows, allowing the central portion to move freely relative to the massager housing. In this way, the massage head and the vibration motor are free to vibrate, with only a small portion of the vibrational energy created by the vibration motor being transmitted to other parts of the device including the user handle. In this aspect, the diaphragm includes the following parts: a central portion to which the massage node and the motor are mounted, a flexible portion surrounding the central portion, and a mounting portion by which the diaphragm is mounted to the body or housing of the massage appliance. In this regard, the phrase "flexible diaphragm" means that at least a portion of the overall diaphragm structure is flexible.

Considered from a different viewpoint, the massage node is carried by a vibration plate to which a vibration motor is mounted. The massage node may be a brush which may be integrally formed with the vibration plate. The vibration plate is mounted to a flexible membrane, which in turn is mounted to the body of the massage appliance such as at the lip of an aperture within the massage appliance. The flexible membrane can contain one or more contours such as folds, bends, or curves. Those contour(s) allow the vibration plate and the vibration motor mounted thereto to move freely relative to the body of the massage appliance, such that the vibration plate vibrates freely, with only a small portion of the vibrational energy created by the vibration motor being transmitted to other parts of the device including the user handle. In this aspect, the vibration plate and the flexible membrane considered together correspond to the flexible diaphragm disclosed in the preceding paragraph.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 1:
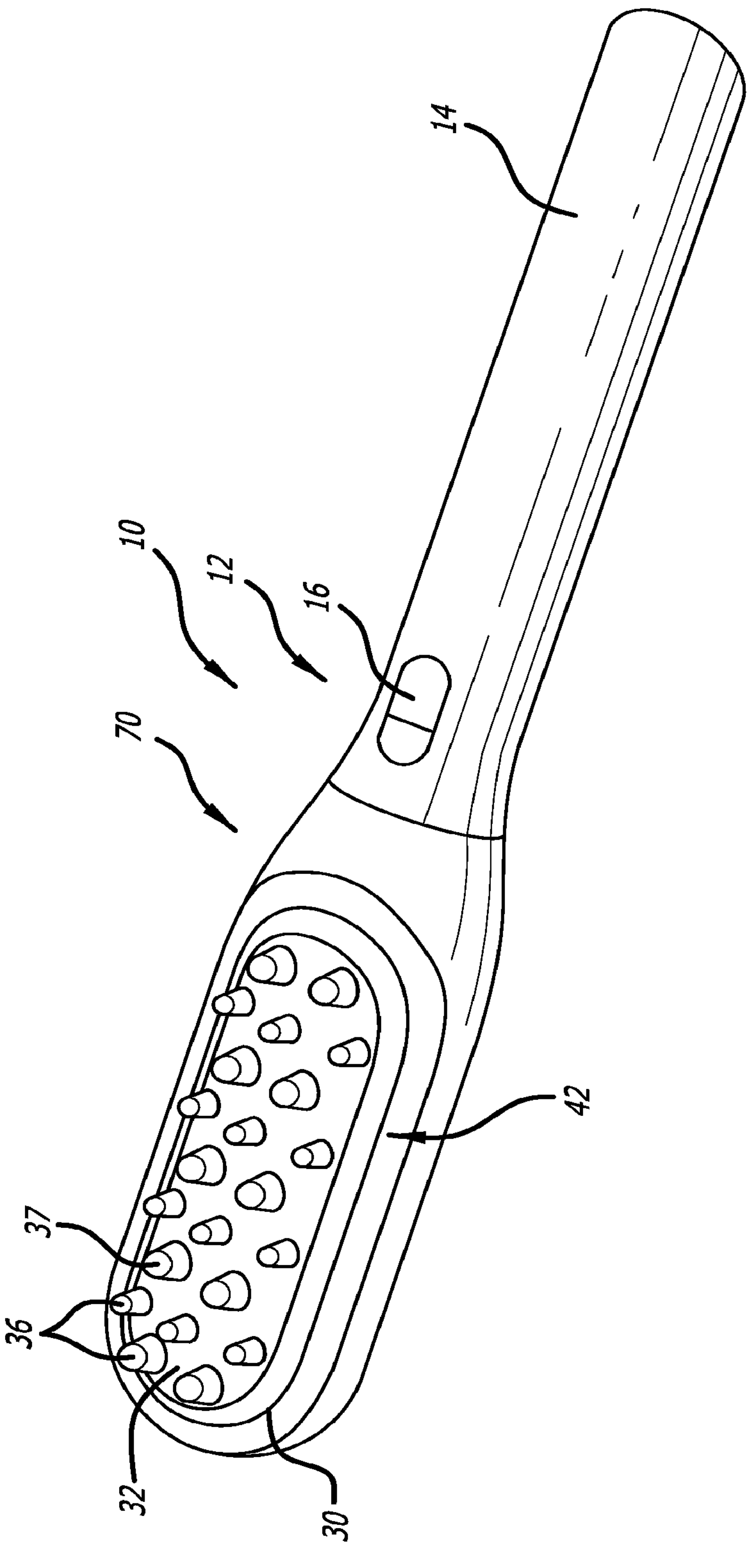
FIG. 1 is an oblique view of a massage appliance according to a first exemplary embodiment of the invention.

FIG. 1 is an oblique view of a massage appliance according to a first exemplary embodiment of the invention. Massage appliance 10 and other embodiments can be used to provide massage to a subject, who may be human or animal. In this particular embodiment the massage node or massage head which comprises a plurality of nubs 36, is a brush 37 that can be used on dogs and other pets. The inventors have discovered that many dogs enjoy receiving a massage via a vibrating brush 37 such as in the embodiment illustrated. The invention, however, can be used with any vibrating massage appliance for application to any subject.

In this exemplary embodiment, massage appliance 10 includes a handle portion 12 having a grip 14 by which a user holds the device, a distal portion 70 that is distal to the handle portion 12, and a user control 16 which can be a single ON/OFF switch, a discrete or variable speed control, and could include similar two or more controls for two or more vibration motor as will be discussed later.

Distal portion 70 carries the massage head or massage node, which in this case is a plurality of nubs 36 which form massage brush 37. Many other shapes and configurations of massage nodes could be used in place of nubs 36, as is well known. Vibration plate 30 could carry a mount such that a variety of different massage nodes can be interchangeably installed onto and removed from the massager as desired by the user. In this embodiment, nubs 36 are integrally formed with, and define a unitary part with, vibration plate 30 having top surface 32. Vibration plate 30 is mounted to, and carried by, flexible membrane 42 which in this embodiment completely surrounds the periphery of vibration plate 30. Vibration plate 30 is thus suspended via flexible membrane 42. In this embodiment vibration plate 30 including its top face 32 and nubs 36 are made of a relatively rigid plastic, but they could also be made of different materials including a firm but not rigid rubber or other elastomer. These parts could be made of virtually any material and take a variety of different shapes as desired or needed for the intended massage type. Vibration plate 30 and top face 32 with its nubs 36 could also be formed of different materials, and could be attached and thus integrated together via a variety of manufacturing techniques including without limitation co-molding, insert molding, sonic welding, compression, and/or adhesive.

Flexible membrane 42 surrounds vibration plate 30 which contacts the user. Flexible membrane 42 allows vibration plate 30 including massaging nubs 36 to move at least partially isolated from the rest of the device 10 including handle 12, minimizing and dampening vibration to those parts.

Figure 2:
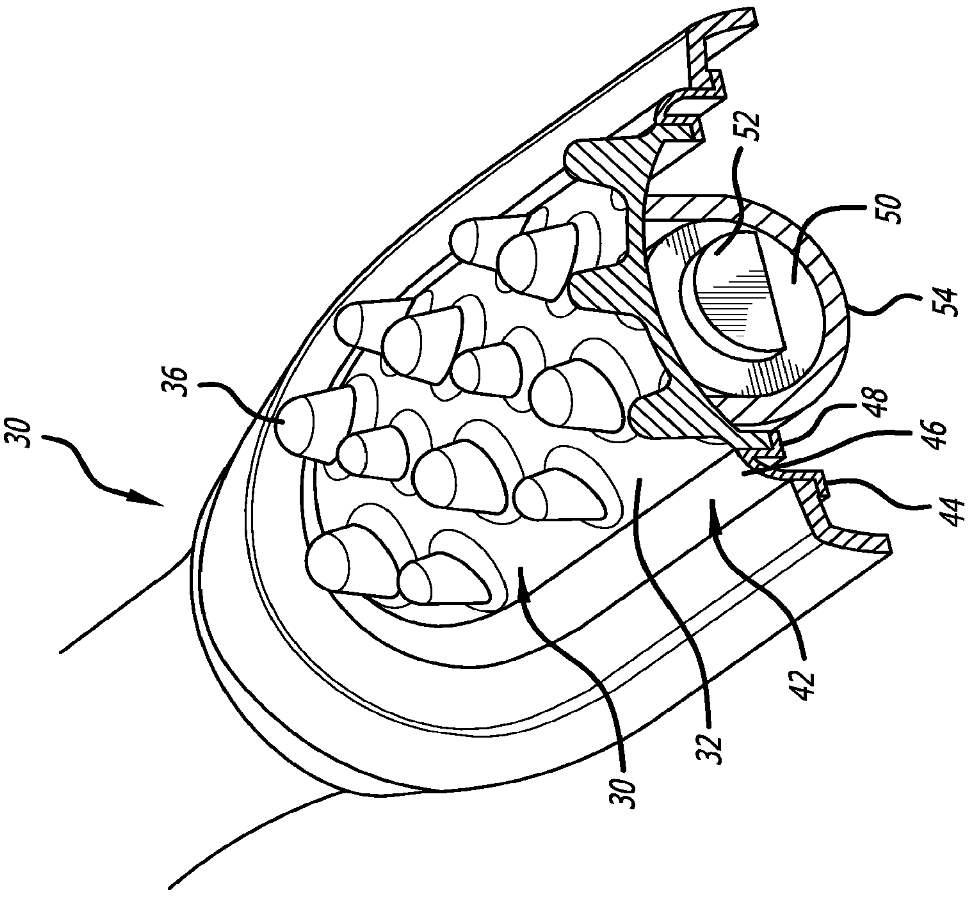
FIG. 2 is an oblique cutaway view of the massage appliance of FIG. 1.

FIG. 2 is an oblique cutaway view of the massage appliance of FIG. 1. Electric motor 50 is mounted to the underside, or inward face, or bottom face, of vibration plate 30. Motor 50 is rotatably coupled to, and drives, eccentric weight 52. Together motor 50 and eccentric weight 52 define a vibration motor or vibration generator.

Massage appliance top housing 72 has an aperture 74 (FIG. 3) formed therein, and a lip 76 surrounding and defining the aperture. In this embodiment aperture 74 and vibration plate 30 have generally round shapes, specifically oval shapes, although other shapes are possible. Flexible membrane 42 preferably comprises an elastomer such as thermoplastic elastomer (TPE), thermoplastic polyurethane (TPU), nitrile rubber (NBR), or neoprene. Elastomeric materials are sometimes referred to generically as "rubber." Flexible membrane 42 includes three portions: a first mounting portion 44 such as a lip or edge by which it is mounted to lip 76 surrounding aperture 74 of the main housing, a flexible portion 46, and a second mounting portion 48 such as a lip or edge by which vibration plate 30 is mounted to flexible membrane 42. The mounting portions may be attached to housing 72 and vibration plate 30 by any suitable method including but not limited to co-molding, insert molding, sonic welding, compression, and/or adhesive. The flexible portion 46 allows vibration plate 30 to move in the x- y-, and z-directions relatively freely, relative to housing 72 and handle 12. That is, flexible portion 46 allows three degrees of freedom for vibration plate 30. Flexible membrane 42 is preferably integrally formed as a unitary piece of material, although it could be constructed of different pieces having different material properties. For example, mounting portions 44, 48 could be, or could have co-molded therein, metal strips, with the metal strips affixed to housing 72 and vibration plate 30 by any suitable method. One advantage of the flexible membrane being unitarily formed of a rubber or rubber-like material is that such a construction can provide a hermetic seal that prevents water or other liquids from entering housing 72.

The construction seen in FIG. 2 stands in contrast to prior art hand-held massagers in which the vibration motor was rigidly attached, either directly or indirectly, to the rigid housing of the device, thus transmitting vibrations substantially unattenuated to the handle and the rest of the device. The present construction therefore provides substantial vibration isolation and attenuation over such prior art devices. In the embodiment shown a vibration motor clamp or bracket 54 is integrally molded with vibration plate 30 and cradles vibration motor 50 to hold it such as by vibration motor 50 snapping into place into clamp 54, such that clamp 54 also functions as a cradle. Alternatively, vibration motor 50 could be secured to vibration plate 30 by a number of different means such as an elastomeric band, or by clamp 54 being secured to vibration plate 30 by mechanical fasteners such as screws including screws that extend into, or are molded into, some of the nubs 36.

Figure 3:
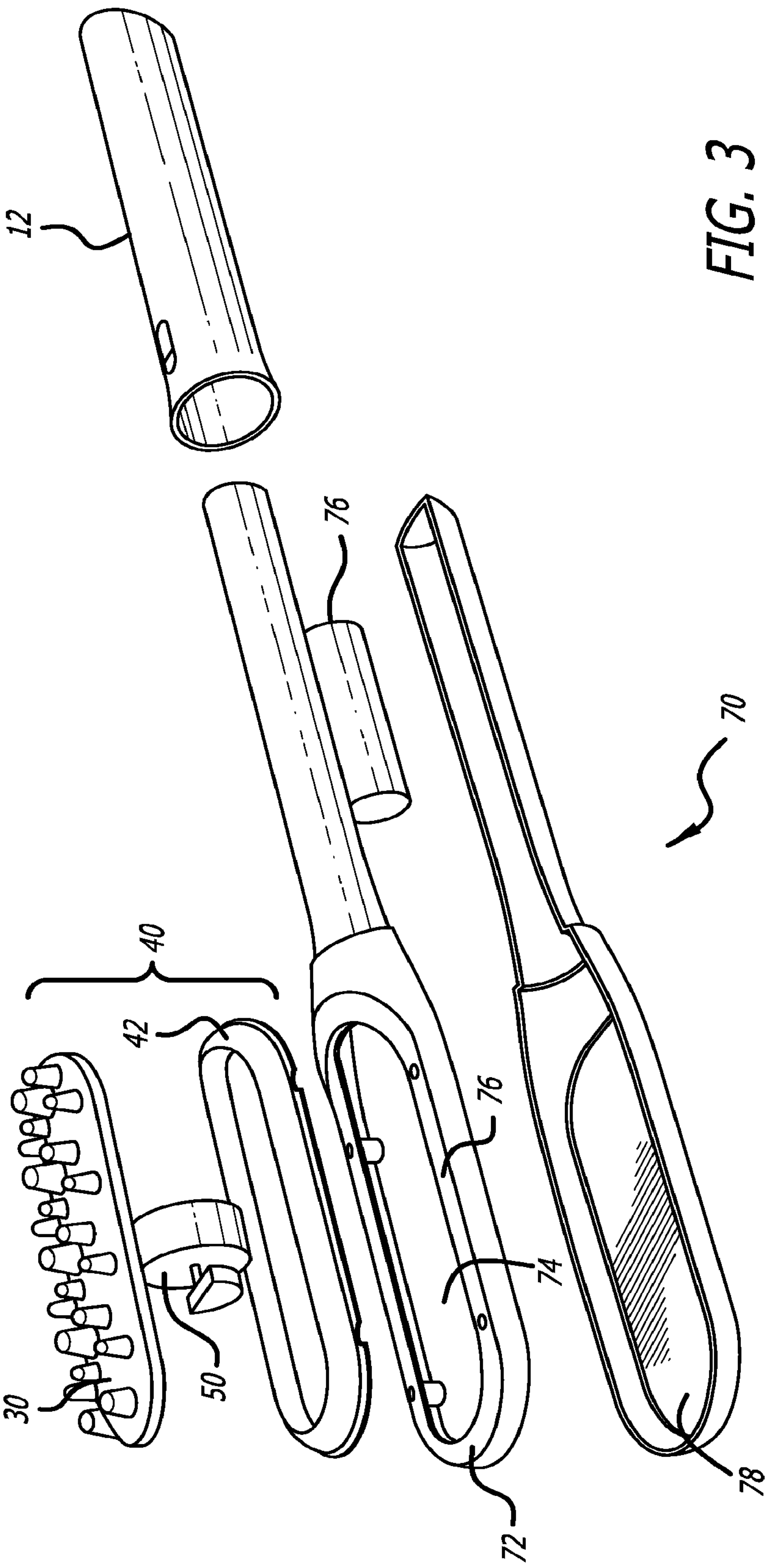
FIG. 3 is a simplified, exploded view of the massage appliance of FIG. 1.

FIG. 3 is a simplified, exploded view of the massage appliance of FIG. 1, revealing top housing 72 having lip 76, bottom housing 78, battery 80, handle portion 12, flexible membrane 42, vibration plate 30, and motor 50. As in other figures, the electrical connections which are conventional have been omitted for clarity of illustration. As perhaps seen best in this view, flexible membrane 42 and vibration plate 30 considered together can be considered to define a diaphragm 40, with vibration plate 30 defining a central and floating portion of diaphragm 40. In an alternate construction diaphragm 40 could be integrally formed of an elastomer with diaphragm 40 completely filling aperture 74, and with a separate vibration node or relatively rigid vibration plate 30 affixed to the central and moving portion of diaphragm 40. Regardless of how it is constructed, diaphragm 40 includes a floating central portion.

Mounting portion 44 (FIG. 2) of flexible membrane 42 is affixed to lip 76 that surrounds aperture 74 of top housing 72, and mounting portion 44 is also affixed to vibration plate 30. Top housing 72 and bottom housing 78 may be made of rigid plastic.

Figure 4:
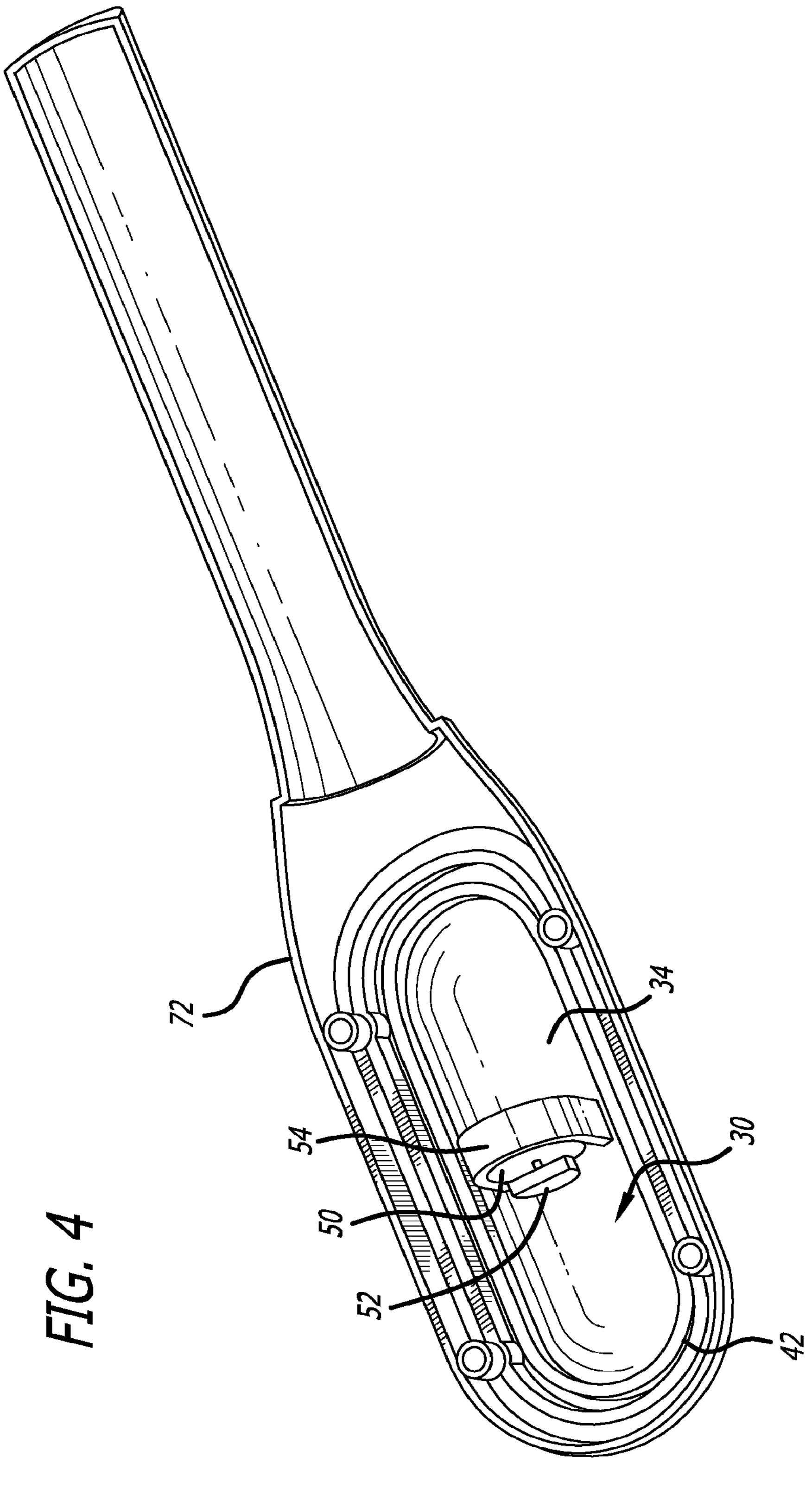
FIG. 4 is an oblique bottom view of the top housing 72, flexible membrane 42, motor 50, and vibration plate 30 of the massage appliance of FIG. 3.

FIG. 4 is an oblique bottom view of the top housing 72, flexible membrane 42, motor 50, and vibration plate 30 of the massage appliance of FIG. 3. Motor 50 is mounted to the inward or bottom face 34 of vibration plate 30.

Figure 5:
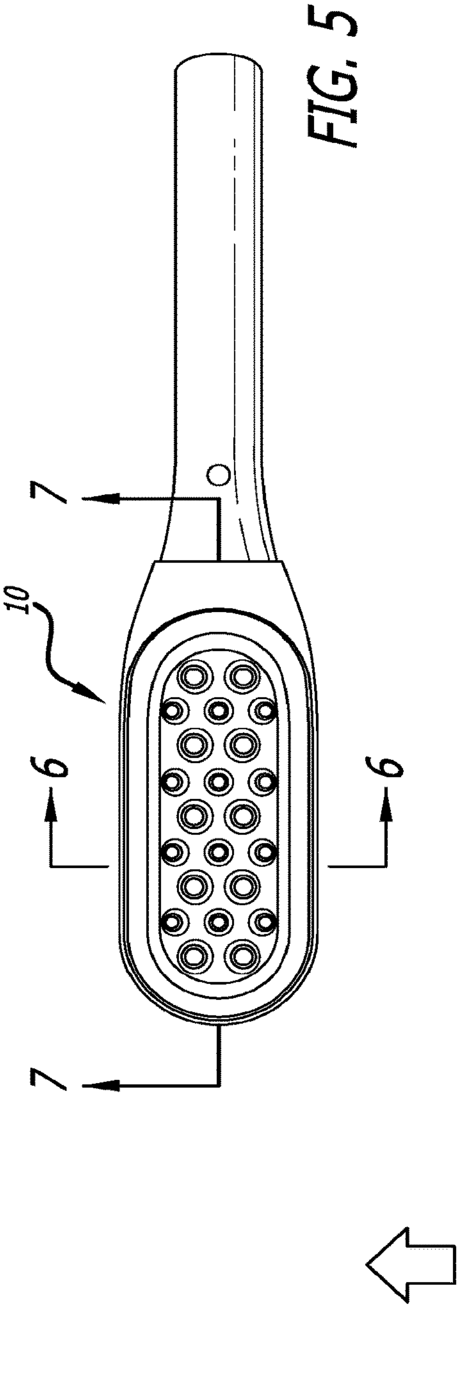
FIG. 5 is a top plan view of the components shown in FIG. 4.

FIG. 5 is a top plan view of the components shown in FIG. 4.

Figure 6:
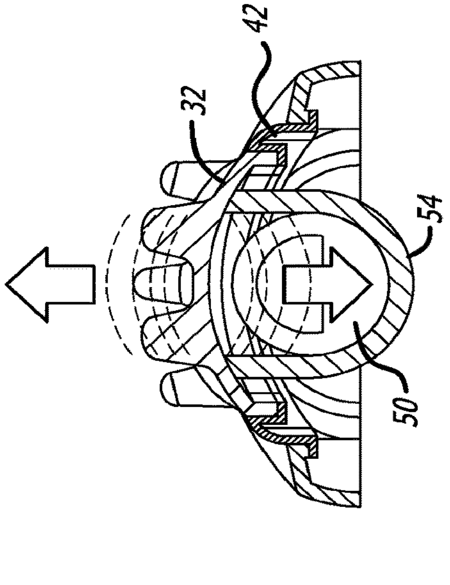
FIG. 6 is a cutaway view of the components shown in FIG. 5, taken along section line 6-6.

FIG. 6 is a cutaway view of the components shown in FIG. 5, taken along section line A-A. As motor 50 and its eccentric weight 52 rotate, the motor provides vibration in the y-direction (laterally) and z-direction (vertically).

Figure 7:
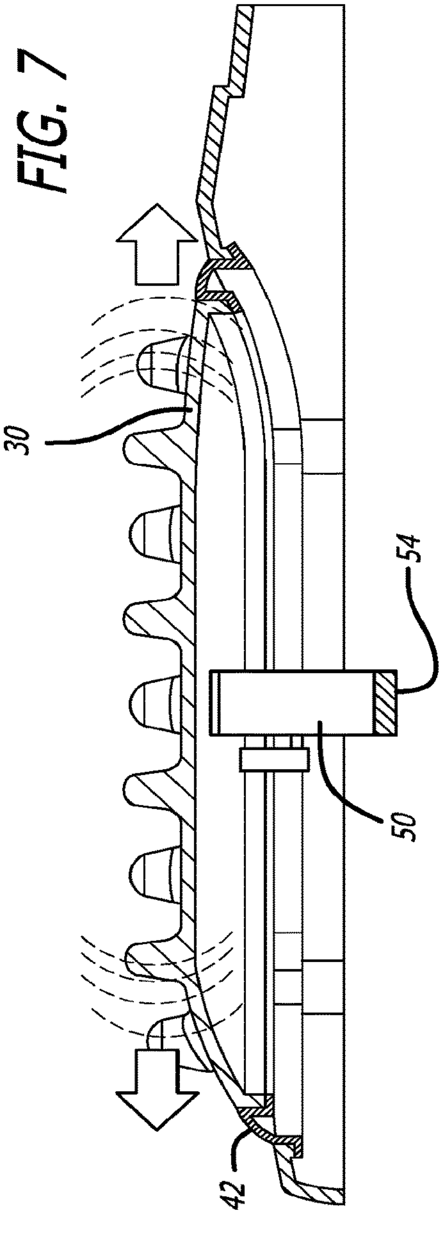
FIG. 7 is a cutaway view of the components shown in FIG. 5, taken along section line 7-7.

FIG. 7 is a cutaway view of the components shown in FIG. 5, taken along section line B-B. The arrows indicate vibrational movement in the x-axis, i.e., longitudinally along the length of the housing.

The shape, thicknesses, contours, and other characteristics of flexible membrane 42 can be modified to achieve desired vibration action, including the relative amount of horizontal and vertical movement.

Figure 9:
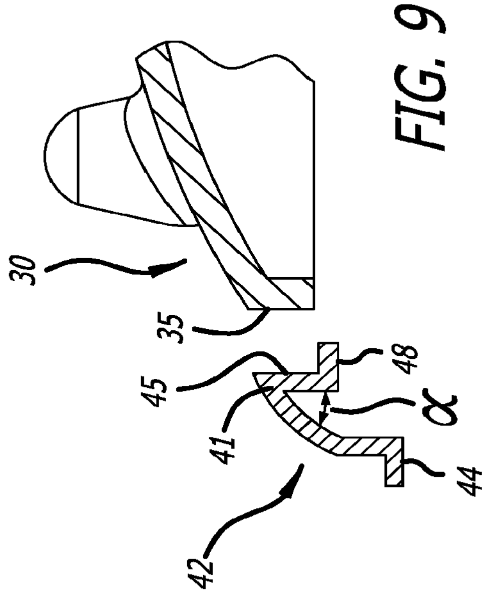
FIG. 9 is an exploded view of the area shown in FIG. 8.
Figure 8:
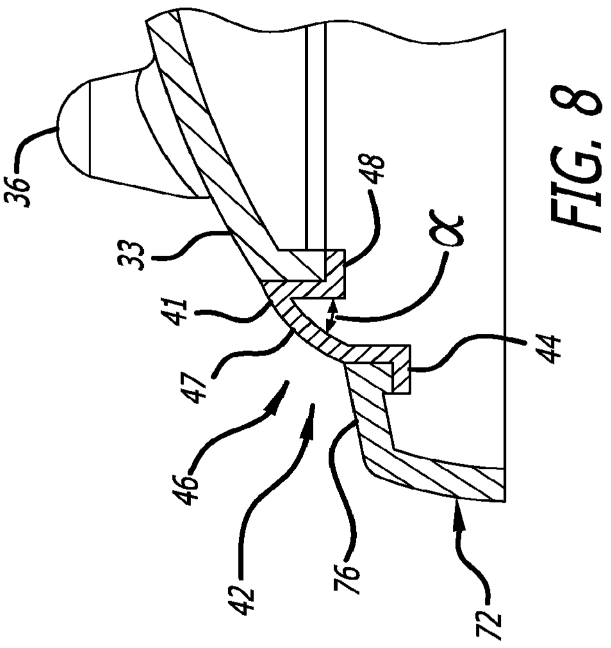
FIG. 8 is a closeup view of area C in FIG. 7.

FIG. 8 is a closeup view of area C in FIG. 7, and FIG. 9 is an exploded view thereof, showing in greater detail flexible membrane 42 and how it mates with vibration plate 30 including curved top surface 33 thereof. Mounting portion 42 is affixed to lip 76 that surrounds aperture 74 of housing 72, and mounting portion 48 is affixed to vibration plate 30. Flexible portion 46 includes at least one contour. In this case flexible portion 46 includes both a curve 47 and a bend 41. Together, curve 47 and bend 41 which subtends an arc of angle α, provide a total angle change of approximately 180 degrees. Preferably, the total angle change provided by contour(s) in the flexible portion is at least 120 degrees. Generally speaking, the softer and thinner the material of flexible portion 46, and the more folds or bends such as bend 41, the less force that will be necessary to move vibration plate 30 a given distance, and thus the less vibration force that will be transmitted to housing 72 and thus to handle portion 12.

In this embodiment curved surface 47 of flexible membrane 42 transitions smoothly to and matches with curved surface 33 of vibration plate 30, and boundary edge 45 of vibration member 42 abuts against boundary edge 35 of vibration plate 30 (FIG. 8), providing a graceful and elegant appearance as seen in FIG. 1.

Figure 10:
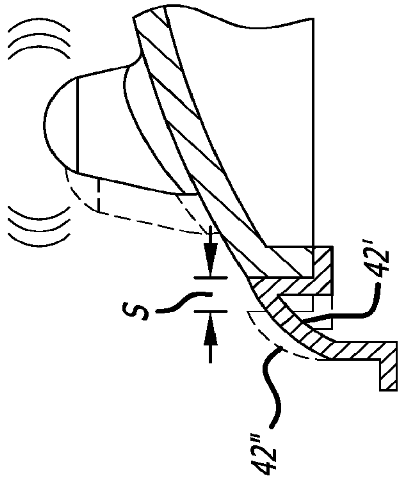
FIG. 10 is a closeup view of area C in FIG. 7, illustrating the parts vibrating in operation.

FIG. 10 is a closeup view of area C in FIG. 7, illustrating the parts vibrating in operation. The parts are shown in their farthest-rightward travel in solid lines, and are shown in their farthest-leftward in dashed lines. The figure illustrates that while mounting portion 44 of diaphragm 40 remains stationary, flexible membrane 42 oscillates between positions 42' and 42". Distance s represents the maximum left-to-right horizontal travel distance of the parts during vibration. Due to the floating or vibration-isolating action of the invention, the vibration at the vibration plate and massage node will be substantially uncoupled from the handle portion 12. "Substantially uncoupled" can mean that horizontal travel distance experienced at the handle when the handle portion is unconstrained such as being suspended by a string for testing purposes, is less than 20% at the horizontal travel distance as measured at the vibration plate and the massage node. That is, the horizontal travel distance at the vibration plate and massage node will be at least five times as great as the horizontal travel distance experienced at the handle portion 12. "Substantially uncoupled" can mean that no more than 20% of the total vibrational energy created by the vibration motor(s) will be transmitted to the handle portion, or that no more than 10% of the total vibrational energy created by the vibration motor(s) will be transmitted to the handle portion and thus felt by the user of the device.

Figure 11:
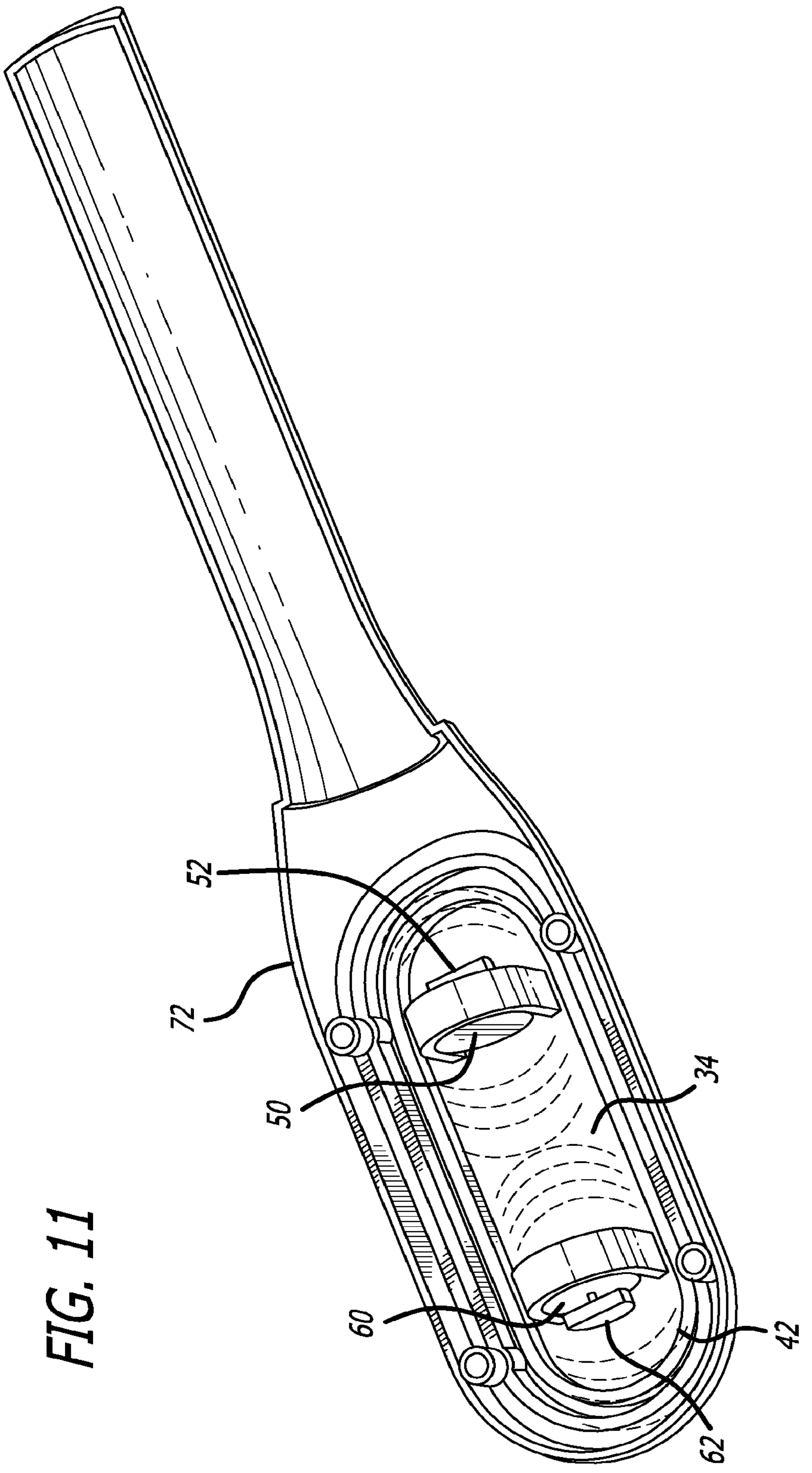
FIG. 11 is an oblique bottom view of a second embodiment of an exemplary massage appliance of the invention in which the massager has two motors.

FIG. 11 is an oblique bottom view of a second embodiment of an exemplary massage appliance of the invention in which the massage appliance includes two motors 50 and 60 which are mounted proximate respectively opposite ends of vibration plate 30, the two motors having respective eccentric weights 52 and 62, respectively. These two (or more) motors operating together can be used to spread or focus vibrational force depending the desired effect. In this embodiment, the user controls 16 can include separate ON/OFF and speed (intensity) controls for the separate motors. An electronic control unit could automatically vary the power applied to the separate motors over time, such as in coordinated rhythmic or pulsing patterns. In this embodiment both motors 50, 60 rotate about the same axis, in this case providing primarily up-and-down (z-dimension) and side-to-side (y-dimension) vibration. In other embodiments, the different motors could be mounted in different orientations to provide different vibrational motions, such as first motor 50 providing y-z motion and second motor 60 providing x-y motion. Depending on the number, type, speed, and orientation of the motors used, the vibration plate 30 can be made to rock and move in various patterns depending on the desired vibration effect. Such movement patterns may be beneficial for some users.

The invention thus achieves a massager in which vibration at the massage node has been substantially isolated or uncoupled from the handle, significantly reducing a source of potential discomfort, fatigue, and/or even injury of the user.

It will be understood that the terms "generally," "approximately," "about," and "substantially" as used within the specification and the claims herein allow for a certain amount of variation from any exact dimensions, measurements, and arrangements, and that those terms should be understood within the context of the description and operation of the invention as disclosed herein.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. For example, different materials may be used, different massage nodes employed, the components may be of different shapes, and different types of motors can be used. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A massage appliance comprising:

a handle for a user to hold;

a distal portion, the distal portion being distal of the handle and coupled thereto, the distal portion having therein an aperture elongated in a direction that is parallel to the longitudinal axis of the handle, and an edge surrounding the aperture defining a lip;

a diaphragm having:

- a central portion having a first and outward face and an opposite second and inward face;
- a flexible portion around the central portion and supporting said central portion; and
- a mounting portion surrounding the flexible portion, the mounting portion being mounted to the lip;

a massage node mounted to the outward face of the diaphragm central portion, the massage node being adapted for application to a subject to be massaged; and a motor mounted to the inward face of the central portion of the diaphragm, the motor operatively coupled to rotate an eccentric weight thereby causing said central portion of the diaphragm and said massage node to vibrate;

wherein the flexible portion of the diaphragm is flexible such that the vibrational movement of the central portion of the diaphragm and the massage node mounted thereto is uncoupled from the handle; and wherein the flexible portion of the diaphragm is nested within the aperture concentrically between the mounting portion and the inward face without contacting the motor.

2. The massage appliance of claim 1 wherein less than 20% of vibrational energy produced by the motor rotating the eccentric weight is transmitted across the flexible portion of the diaphragm to the lip of the aperture.

3. The massage appliance of claim 1 wherein when the massage appliance is operating at a highest available speed selection, a base of the massage node vibrates with a horizontal travel distance of at least 5 times a horizontal travel distance of the handle when the handle is unconstrained.

4. The massage appliance of claim 1 wherein the flexible portion of the diaphragm has at least one contour, said contour selected from the group consisting of a curve, a bend, and a fold.

5. The massage appliance of claim 4 wherein the contour includes a total angle change of at least 120 degrees.

6. The massage appliance of claim 1 wherein:

the aperture and the mounting portion of the diaphragm each have a generally rounded shape;

the mounting portion of the diaphragm extends around the lip of the aperture; and the diaphragm flexible portion has a contour that is proximate to the mounting portion and extends around the mounting portion, the contour providing to the diaphragm central portion freedom of movement in two dimensions relative to the aperture edge.

7. The massage appliance of claim 1 wherein the flexible portion and the mounting portion of the diaphragm are integrally formed as a unitary part comprising an elastomer.

8. The massage appliance of claim 1 wherein:

the diaphragm central portion comprises a curved plate having a concave inward surface:

the massage node comprises a plurality of flexible nubs integrally formed with the curved plate;

the motor is mounted directly to the concave inward surface of the curved plate; and the diaphragm flexible portion separates the curved plate and vibrations induced therein from the lip of the aperture, thereby isolating said vibrations form said aperture and from said handle.

9. The massage appliance of claim 1 wherein the central portion of the diaphragm is formed separately from, and of a different material than, the flexible portion.

10. The massage appliance of 9 wherein:

the central portion of the diaphragm has a curved top surface, an outer perimeter thereof defining a first boundary edge;

the flexible portion of the diaphragm has a curved top surface, an inner perimeter thereof defining a second boundary edge;

the first and second boundary edge abut together, with the second boundary edge surrounding the first boundary edge; and the curved top surface of flexible portion of the diaphragm transitions smoothly to the curved top surface of the central portion of the diaphragm.

11. The massage appliance of claim 1 wherein the massage node is a brush.

12. The massage appliance of claim 11 wherein the brush and the central portion of the diaphragm are integrally formed and define a unitary part.

13. The massage appliance of claim 1 wherein:

the motor defines a first motor, the first motor being mounted proximate a first end of the diaphragm central portion;

the motor comprises the eccentric weight that defines a first eccentric weight; and the massage appliance further comprises:

a second motor mounted proximate a second end opposite the first end of the diaphragm central portion, the second motor operatively coupled to rotate a second eccentric weight; and a user-operated controller for separately controlling the first and second motors.

14. A massage appliance comprising:

a handle portion and a distal portion, the distal portion being located distal of the handle portion;

a flexible diaphragm having a moving part and peripheral edge, the peripheral edge being mounted to the distal portion of the massage appliance such that the moving part is free to move in at least two dimensions while the peripheral edge remains stationary;

a vibration generator mounted to the moving part of the flexible diaphragm;

a massage node mounted to the moving part of the flexible diaphragm, the massage node being vibrated when power is applied to the vibration generator;

wherein a perimeter of the peripheral edge surrounds a perimeter of the moving part, with the movable part being nested concentrically within the peripheral edge; and wherein the flexible diaphragm provides vibration isolation between the moving part thereof and the peripheral edge thereof that when power is applied to the vibration generator and the massage node is vibrated, vibration at the massage node is decoupled from the handle portion.

15. The massage appliance of claim 14 wherein the flexible diaphragm provides isolation between the moving part thereof and the peripheral edge thereof that when power is applied to the vibration generator and the massage node is vibrated, the moving part oscillates with a horizontal travel distance that is at least 5 times a horizontal travel distance by which the handle portion moves when the handle is unconstrained.

16. The massage appliance of claim 14 wherein:

the flexible diaphragm further comprises a flexible contoured portion between the moving part and the peripheral edge, the flexible contoured portion having a contour that includes a total angle change of at least 120 degrees, the flexible contoured portion allowing the moving part to move relative to the peripheral edge.

17. A massage appliance comprising:

a body including a handle;

a floating portion comprising a massage node and a vibration motor affixed thereto;

a vibration isolator for allowing the floating portion to float relative to the body, the body vibration isolator comprising:

an edge affixed to the body;

a flexible portion disposed inwardly of the edge, the flexible portion having at least one contour; and a floating portion mounting section, the floating portion being affixed thereto;

wherein the at least one contour of the flexible portion provides increased flexibility and freedom of movement for the floating portion relative to the body;

wherein the flexible portion of the vibration isolator has a curved inner perimeter;

wherein the floating portion has a curved outer perimeter; and wherein the flexible portion extends around the curved outer perimeter of the floating portion, with the floating portion being nested within the curved inner perimeter of the flexible portion.

18. The massage appliance of claim 17 wherein the flexible portion allows for free movement of the floating portion relative to the body in at least two dimensions.

19. The massage appliance of claim 17 wherein the flexible portion allows for free movement of the floating portion relative to the body in three dimensions.

20. The massage appliance of claim 17 wherein the flexible portion comprises an elastomer, and the curved inner perimeter of the vibration isolator matches with the curved outer perimeter of the floating portion and abuts thereto.

* * * * *